Oct. 8, 1957  A. FRIEDMAN ET AL  2,808,790
REFRIGERATING TUNNEL
Filed May 18, 1955  3 Sheets-Sheet 2
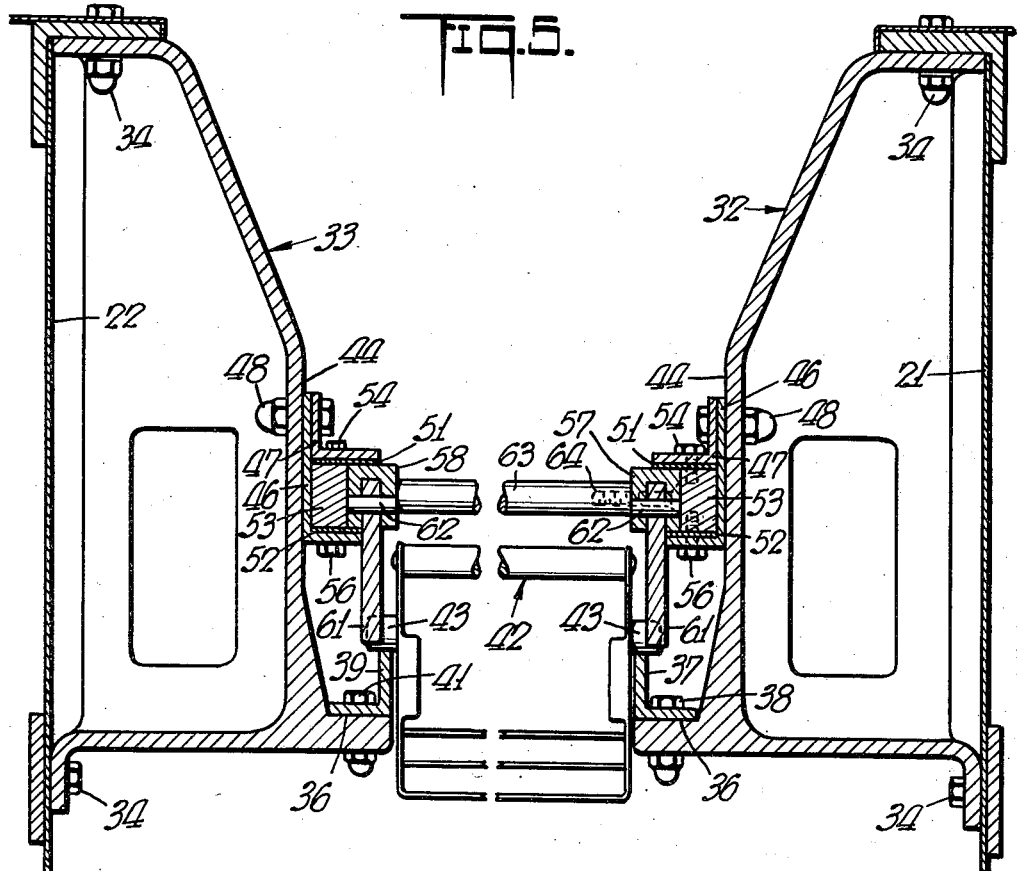
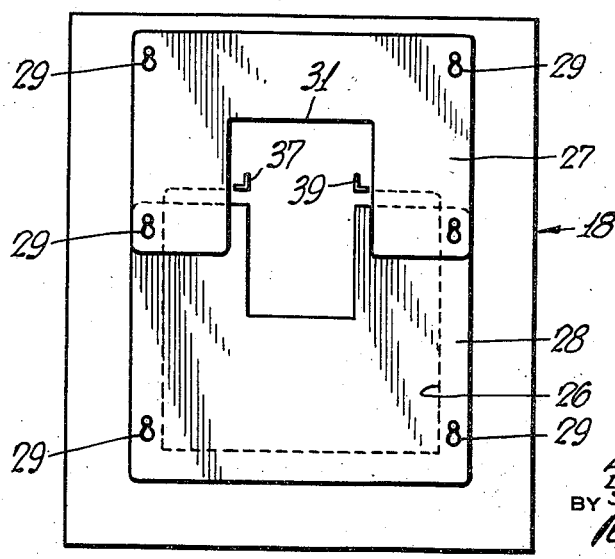
INVENTOR
AARON FRIEDMAN
DANIEL LURIE
BY SHELDON DALE
ATTORNEY

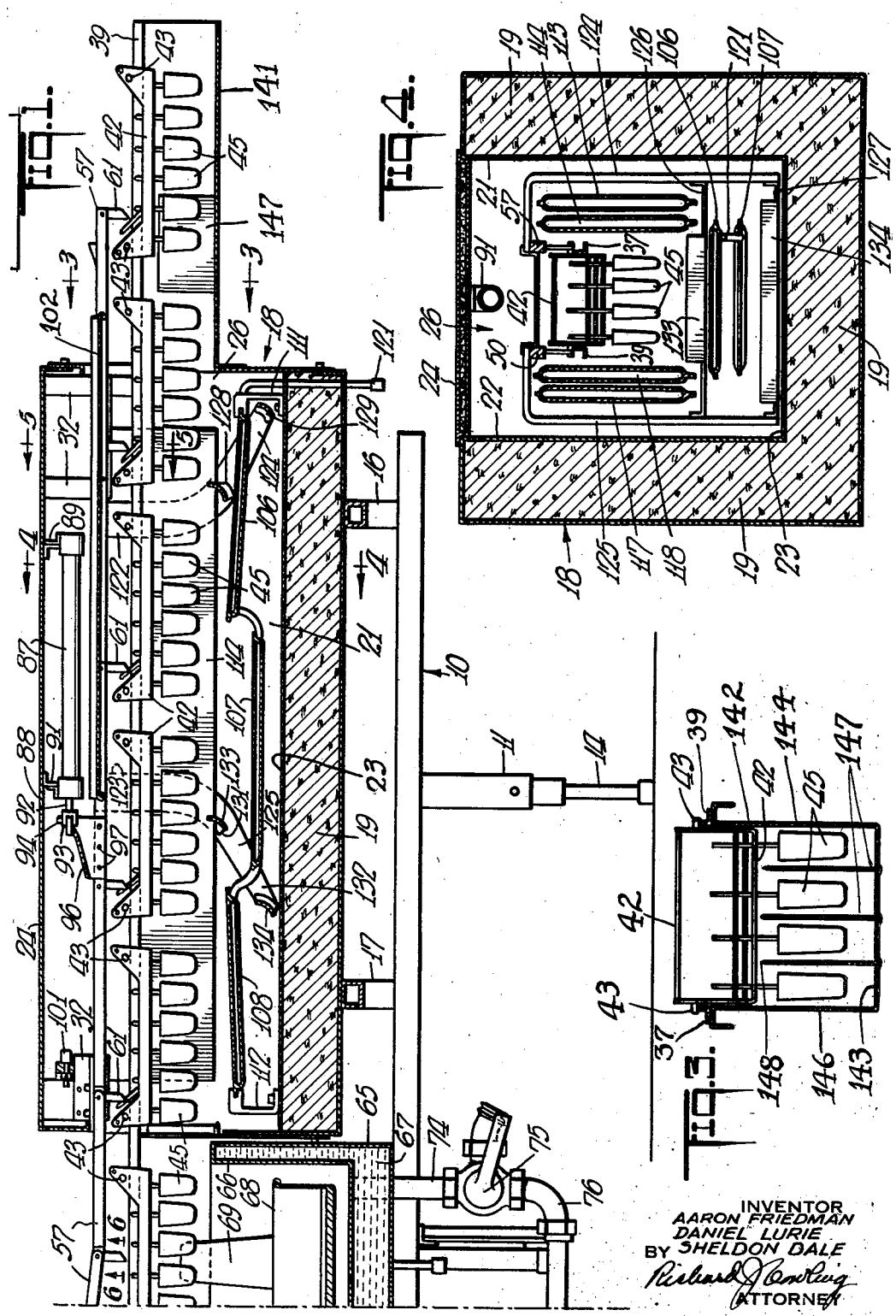

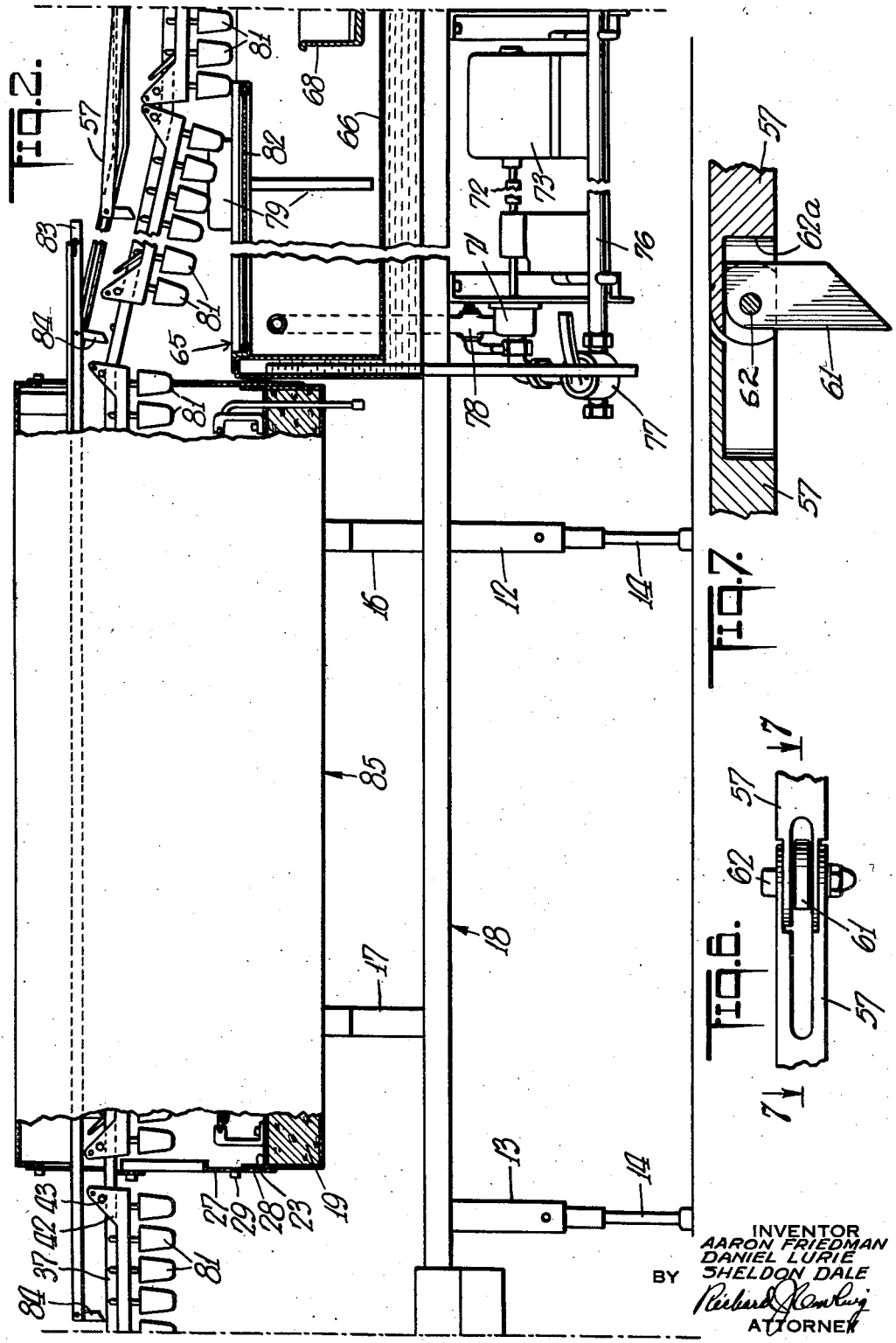

United States Patent Office 2,808,790
Patented Oct. 8, 1957

2,808,790

REFRIGERATING TUNNEL

Aaron Friedman and Daniel Lurie, New York, and Sheldon Dale, Riverdale, N. Y., assignors to Joe Lowe Corporation, New York, N. Y., a corporation of Delaware Application May 18, 1955, Serial No. 509,270

15 Claims. (Cl. 107—8)

The present invention relates generally to refrigerating units, and it has particular relation to a refrigerated chilling or cooling tunnel of the type used in the frozen confectionery industry to refreeze the outer surfaces of frozen confections after the operations of defrosting and/or coating.

Heretofore, it has been the practice in the semi-automatic and automatic frozen confectionery industry to pass the frozen confections through a chilling or cooling tunnel immediately after the steps of defrosting and/or coating in order to facilitate the "drying" or refreezing of the outer wet or melted surfaces thereof in a minimum amount of time. Such tunnels were merely an elongated enclosure open at both ends having means at the top for holding a quantity of Dry Ice or cold plates for chilling or cooling the air therein, which, in turn, facilitated the "drying" of the wet outer surfaces of the confections or coatings. While such tunnels were an improvement over the original method of permitting the frozen confections to stand in the open at room temperatures until their wet outer surfaces became refrozen from the latent refrigeration in the frozen body portion, they were not efficient or entirely satisfactory. One of the big disadvantages of these tunnels was due to the fact that the refrigerated air had to pass over, through and/or around the stickholders before coming into contact with the frozen body portions of the confections depending therefrom. Such an operation caused a frequent freezing-up of the stickholders to an extent that they could not be opened to release the frozen confections threfrom.

The present invention is a big improvement over the aforementioned chilling or cooling tunnels, and provides a tunnel construction wherein the refrigerated air is directed against the frozen confection bodies instead of against the stickholder. In this construction, the cold air within the tunnel is maintained in an agitated condition without requiring the drawing in of large quantities of warm moist air from the surrounding atmosphere of the room wherein the tunnel and defrosting tank are located. The infiltration of large quantities of warm moist air into the tunnel would cause a rapid formation of frost and/or ice to form over the refrigerating coils or plates, which would soon act as an insulating medium against effective and efficient refrigeration. The construction of the present tunnel permits it to be washed down with a hose at the end of each work day by merely removing the end plates and turning a hose into the passageway, as the tunnel is installed in a slightly tilted position away from the coating tanks to facilitate draining of the wash water therefrom.

An object of the present invention is to provide a simple, inexpensive and efficient chilling or cooling tunnel for "drying" or refreezing the outer surfaces of the confections being passed therethrough.

Another object of the invention is the provision of a durable, inexpensive and sanitary chilling or cooling tunnel, which is easy to inspect and maintain in a sanitary condition.

A further object of the invention is to provide a simple, efficient and inexpensive means for propelling intermittently and continuously end-to-end stickholders with their pendant confections through a chilling or cooling tunnel for refreezing the outer surfaces thereof efficiently and speedily.

Another object of the invention is the provision of simple, inexpensive and efficient means for causing the circulation or agitation of refrigerated air throughout said tunnel and around said pendant confections as they pass therethrough without requiring the intake of large quantities of warm moist air from the surrounding atmosphere.

Various other and further objects and advantages of the invention, which result in simplicity, economy and efficiency, will be apparent from the following detailed description, wherein a preferred form of embodiment of the same is shown, reference being had for illustrative purposes to the accompanying drawings forming a part hereof, wherein like numerals indicate like parts, in which:

Figure 1 is a fragmentary longitudinal sectional view of a chilling or cooling tunnel unit constructed in accordance with the principles of the invention, said tunnel unit showing a series of stickholders with their pendant confections being received from the defrosting operation (not shown) and being conveyed to a coating tank for the coating operation;

Figure 2 is a fragmentary side elevational view, partly in section, showing in greater detail the remainder of the coating tank and a second chilling or cooling tunnel unit for "drying" or hardening the coated surfaces of the confections after the coating operation, the detailed construction of the second chilling or cooling tunnel being substantially identical with the first chilling or cooling tunnel shown in Figure 1;

Figure 3 is a slightly enlarged cross-sectional view of the entrance or receiving portion of the main trackway shown in Figure 1, the same having been taken substantially along the line 3—3 thereof, looking in the direction of the arrows, and showing a device containing a plurality of transversely spaced and longitudinally extending knives for cutting web-like formations that frequently form between the confections of adjacent rows during the freezing operation when excess quantities of unfrozen material have been placed in a mold cavity and overflows onto the mold pan where it becomes frozen into a web-like formation;

Figure 4 is an enlarged cross-sectional view of the chilling or cooling tunnel unit shown in Figure 1, the same having been taken substantially along the line 4—4 thereof, looking in the direction of the arrows;

Figure 5 is an enlarged cross-sectional view of opposite bearing supporting brackets forming rails or a trackway over which the pusher bars may be reciprocated in order to move the stickholders intermittently along their main trackway, one stickholder being shown diagrammatically without confections mounted on the main trackway;

Figure 6 is an enlarged bottom plan view of one of the pivotal and longitudinal connections between adjacent pusher bar sections of the reciprocating mechanism, the same having been taken substantially along the line 6—6 of Fig. 1, looking in the direction of the arrows, and showing the detailed construction and mounting of a depending pawl;

Figure 7 is a further enlarged longitudinal sectional view of the connection shown in Figure 6, the same having been taken substantially along the line 7—7 thereof, looking in the direction of the arrows; and Figure 8 is an end elevational view, showing the end closure plates, with its oppositely swinging doors removed, the position of the supporting rails of the main trackway being diagrammatically shown in the passageway.

Referring now to the drawings and particularly to Figures 1 and 2 thereof, there is shown a suitable base structure 10 of rectangular shape, having pairs of transversely spaced legs 11, 12 and 13, each leg of which is provided with self-adjusting feet 14.

Mounted on one end of the base structure 10 on a pair of suitable longitudinally spaced and transversely extending channel members 16 and 17 is a chilling or cooling tunnel 18. The tunnel 18 is of a substantial length as compared to its cross-sectional dimensions, which form substantially a square. The tunnel 18 is insulated, as indicated at 19, along its opposite sides 21 and 22 and along its bottom 23. The top side of the tunnel 18 is closed by means of a removable insulated cover plate 24. The insulated walls and bottom with the top cover plate form a longitudinally extending insulated passageway 26 therethrough. The opposite ends of the tunnel 18 are each closed by a pair of removable plate members 27 and 28, which overlap and are mounted removably on a series of spaced studs 29, as best shown in Figure 8, leaving a small central opening 31 for the main trackway and the stickholders supported thereby to pass therethrough. This small opening 31 may be closed in any suitable manner, as by a pair of swinging doors (not shown) opening oppositely to each other by the stickholders as they move along the main trackway.

The showing of the brackets 32 in Figure 1 is diagrammatic only in order to illustrate the mounting arrangement thereof, the details of the bracket being shown in the enlarged view comprising Figure 5.

Referring now to Figure 5, there is shown a pair of apertured and flanged side supporting brackets 32 and 33, which support the main trackway and the reciprocating mechanism within the passageway. A series of pairs of brackets similar to the brackets 32 and 33 are mounted oppositely and longitudinally of the passageway to the sidewalls 21 and 22 of the frame structure by bolts 34. It will be appreciated that each pair of brackets 32 and 33 must be spaced sufficiently to permit the desired longitudinal movement of the pusher bars of the reciprocating mechanism, which are used to move the stickholders along the main trackway.

Each of the brackets 32 and 33 is substantially similar in construction, and each has a bottom ledge 36 projecting horizontally inwardly towards the other. The ledge 36 of the bracket 32 is adapted to receive an angle iron rail member 37, which is secured fixedly thereto by means of a bolt 38. The corresponding ledge of the bracket 33 is adapted to receive an angle iron rail member 39, which is secured fixedly thereto by means of a corresponding bolt 41. The rail members 37 and 39 form a main trackway through the tunnel 18 for receiving and supporting the stickholders 42 by their laterally extending supporting studs 43.

The stickholders 42 depicted in the drawings are of a conventional construction, and may be of any of the types now in general use in the industry. The operating features of the stickholder 42 form no part of the present invention and are well known and understood. All stickholders currently in use in the industry are of a standard size and shape in order that they may be used interchangeably with different types of frozen confection equipment without alteration.

Referring again to Figure 5, each of the supporting brackets 32 and 33 has a vertical side edge intermediate its ends, as indicated at 44. Mounted along each of said vertical side edges of each bracket is a pair of stainless steel bearing angles 46 and 47, which are secured by means of suitable fastening bolts 48. It will be noted that the vertical side of the outer bracket 46 is longer or higher than the corresponding side of the inner bracket 47, and that their two horizontal sides form a channel therebetween. The inner faces of the horizontal sides of the brackets 46 and 47 are covered with a nylon sheet material, as indicated at 51 and 52, and the back outer vertical part of said channel has a brass bar 53 mounted thereon, which is held in position by suitable tap screws 54 and 56.

Aluminum alloy pusher bars 57 and 58 are mounted slidably within the channels defined by the brass bars 53 and the nylon covered surfaces 51 and 52 of the bearing angles 46 and 47 of the brackets 32 and 33, respectively. The pusher bars 57 and 58 each has a series of longitudinally spaced depending pawls 61 mounted therein, as best shown in Figures 6 and 7, which pawls are pivoted on a fastening bolt 62. It will be noted that the pawls 61 are capable of pivoting forwardly only because of the manner in which they have been mounted in their respective pusher bars. The shoulder 62-a of each recess will prevent pivoting in a backward direction. See Figure 7.

The pusher bars 57 and 58 may extend the entire length of the tunnel 18, or they may be formed of a series of longitudinally connected pivotal sections, as best shown in Figure 1, where the stickholders with their pendant confections 45 are being moved up a slight incline for proper positioning over a conventional coating or dipping tank operation 65.

The oppositely mounted pusher bars 57 and 58 are connected transversely at longitudinally spaced intervals approximately equal in length to the spacing of the pawls 61 by a series of connecting rods 63 mounted by countersunk machine screws 64.

A portion of a dipping tank operation is shown at the exit end of the chilling and cooling tunnel 18 mounted upon the supporting structure 10, but it forms no part of the present invention and is of a conventional construction. The remainder of the dipping operation is shown in Figure 2. The dipping operation will be described only sufficiently to enable an understanding of the problems involved in the movement of the stickholders 42 by the pusher bars 57 and 58 of the present invention. The coating or dipping operations consists of a main coating tank 66, which is shown to be of a water-jacketed construction, as indicated at 67, and is adapted to hold a relatively large quantity of coating material, such as chocolate, (not shown) at a constant and desired temperature. An inner dipping tank 68 is mounted on a suitable supporting arm 69, which is reciprocable vertically. The innner dipping tank 68 is adapted to be submerged in the main body of coating material contained in the main coating tank 66. The inner dipping tank 68 is of such size and shape as to receive the confections 45 depending from a single stickholder 42. The reciprocable arm 69 serves to raise and lower the inner tank 68 in timed sequence with the movement of the stickholders 42 over the rails 37 and 39 of the main trackway. When the stickholders 42 are at rest on the main trackway, the inner tank 68 is raised to its uppermost position immediately under the stickholder positioned thereabove, whereupon its depending confections 45 are submerged into the coating material contained therein. A considerable portion of the coating material contained in the inner tank 68 will be displaced during the time the confections 45 are being submerged therein, and this displaced coating material will overflow the sides of the inner tank 68 and run down and back into the main body of coating material in the outer tank 66.

The coating material in the main supply tank 66 is maintained in constant circulation by means of a pump 71 that is connected by a flexible coupling 72 to an electric motor 73. The circulation of the coating material in the main supply tank 66 is through the pipe lines 74, drain valve 75, pipe line 76, inlet valve 77, pump 71 and the inlet or delivery pipe line 78. When it is desired to add additional coating material to the coating material in the main coating tank 66, this may be done through the inlet valve 77 and inlet pipe 78. A thermostat 79 controls the temperature of the water 67 in the surrounding jackets of the main coating tank 66, which, in turn, controls the temperature of the coating material within said tank.

As the coated confections 81 are moved forwardly beyond the vertical plane of the movement of the inner dipping tank 68 and over and above the screen covered portion 82 of the main coating tank 66, they will remain in this position while the next succeeding stickholder 42 loaded with confections 45 is being coated, during which time any coating droplets may gravitate back into the main coating tank 66 through the screen 82. The screen 82 prevents any coated confections 81 that might fall from their handle sticks due to melting from dropping into the coating material contained within the tank 66.

In the arrangement shown in Figure 2, it will be noted that as the coated confections 81 with their stickholders 42 are moved beyond the main coating tank 66, the pusher bars 83 of a second conveyor, having depending pawls 84, takes over the further movement of them and passes them through a second chilling or cooling tunnel 85. The chilling or cooling tunnel 85 has a construction identical to that shown and described for the tunnel 18, and its reciprocating pusher bars 83 are constructed and mounted as shown and described for the pusher bars 57 and 58. The pawls 84 of the reciprocating pusher bars 83 are constructed and mounted as shown and described for the pawls 61. When the coated confections 81 emerge from the second chilling or cooling tunnel 85, their coatings are hard, dry and non-tacky. The stickholder 42 is next moved to a bagging operation, which is not shown and which may be manual or mechanical, as desired. It will be appreciated that, if the bagging operation is mechanical, the movement of the pusher bars of the two chilling and cooling tunnels 18 and 85 must be synchronized with the bagging operation. This may be done by connecting the controls for the pusher bar mechanism with the controls for the bagging machine in a conventional manner well within the skill of an electrician.

The reciprocating conveyors of each of the chilling and cooling tunnels 18 and 85 in the modification shown in the drawings are operated by separate air cylinders. A description of one such operating means will be sufficient for an understanding of the operation for both chilling and cooling tunnels 18 and 85. The reciprocating means for the pusher bars 57 and 58 of the chilling and cooling tunnel 18 is best shown in Figure 1, and consists of an air cylinder 87 mounted on the underside of the top frame structure 88 by suitable longitudinally spaced brackets 89 and 91. A piston rod 92 of the cylinder 87 is connected by a bifurcated transversely extending bracket 93, and a series of transversely spaced bolts 94 to a U-shaped plate member 96, which is, in turn, secured at its sides to each of the spaced pusher bars 57 and 58 by the bolts 97.

The piston rod 92 travels a distance approximately one-third greater than the length of a stickholder 42 in order to permit its pawls 61 to be moved backwardly beyond the rear handle of said stickholder before beginning its forward movement again. This extra distance of movement not only makes certain that the stickholders 42 are moved through the chilling and cooling tunnel 18 and delivered in proper position for the coating operation 65, i. e., being centered vertically above the inner tank 68, but it also insures that each stickholder 42 is taken into tow by a depending pawl 61 regardless of the position in which it has been positioned manually on the entrance rails 37 and 39 of the main trackway.

In order to present the stickholders 42 with their depending confections 45 to the coating operation 65 in proper position for dipping, the pawls 61 moving the stickholders must push against or engage their front pairs of studs 43 mounted on the forward handle uprights. However, with the extra movement of the pusher bars 57, if the stickholders are not positioned properly on the rails 37 and 39 of the trackway at the entrance of the tunnel 18 so that they will be moved forwardly by their front studs, they will be picked up and moved by the pawls which engage their back studs. However, before the stickholders 42 are moved more than one movement they will be in a position to be engaged by their front studs and in that manner to be carried forwardly to the dipping operation 65. In other words, the extra length of the movement of the pusher bars 57 and 58 makes the engagement of the pawls self-correcting to the extent that no matter which set of studs are engaged originally the front studs will be engaged by the time the stickholders are entirely within the passageway 26.

As the air in the cylinder 87 moves its piston (not shown) forwardly or from right to left, its piston rod 91 will be similarly moved, carrying the forward edge of its bar 93 into a position where it will strike a stop button 101 at the end of its forward movement. The stop button 101 controls the electrical energization of an air valve (not shown) to reverse the flow of air in the cylinder 87, causing its piston to be moved backwardly or from left to right, thereby drawing the pusher bars 57 and 58 backwardly and swivelling the depending pawls 61 over the studs 43 of the stickholders 42 stationed therebelow on the main trackway. It will be noted that a drip pan or cover 102 is mounted removably below the air cylinder 87 to catch any oil or grease dripping therefrom and serves to prevent the same from contaminating the stickholders 42 or their depending confections 45 therebelow.

Referring now to Figure 1, it will be noted that the passageway 26 of the chilling or cooling tunnel 18 is provided with a series of spaced connected refrigerated plates 106, 107 and 108 along the bottom 23 and spaced inwardly therefrom. These plates 106, 107 and 108 are mounted between suitable longitudinally spaced brackets 111 and 112. Referring now to Figure 4, it will be noted that between the side 21 and the rail member 37 of the main trackway there are mounted a second series of refrigerated plates 113 and 114, which are mounted fixedly between longitudinally spaced supporting brackets (not shown). A third series of refrigerated plates 117 and 118 are mounted between the rail member 39 of the main trackway and the side 22. Thus, it will be seen that the entire passageway 26 below the main trackway is provided with refrigerating plates for cooling the air therein. These series of refrigerated plates are connected in a conventional manner to a refrigerating system through a suitable pipe line 121 (see Fig. 1).

Each of the pusher bars 57 and 58, which operate in unison, have mounted fixedly thereon a pair of longitudinally spaced brackets 122 and 123 (see Figs. 1 and 4). These brackets 122 and 123 each carry outwardly and oppositely curved arm members 124 and 125, respectively, the arms 124 extending rearwardly of the passageway 26 and the arms 125 extending forwardly of the passageway 26. A pair of vertically spaced cross-arms 126 and 127 connect each pair of arms 124 and 125 transversely of the passageway 26 above and below the refrigerating plates 106 and 107, as best shown in Figure 4. A second pair of vertically spaced cross arms 131 and 132 connect the spaced arms 125 above and below the refrigerating plates 107 and 108. The cross-arms 126 and 127 have mounted thereon an air scoop 128 and 129, respectively, and each of the cross-arms 131 and 132 have mounted thereon air scoops 133 and 134. The airscoops 128 and 129 and 133 and 134 are arcuate in shape and reciprocate forwardly and backwardly with the movement of the pusher bars 57 and 58, causing the refrigerated air in the passageway 26 adjacent the refrigerated plates to be agitated, circulated and directed towards and around the frozen confections 45 pending from their respective stickholders 42.

In the operation of the apparatus, it will be assumed that the defrosting operation and the bagging operation are manual. However, it will be appreciated that, if such operations are automatic, it will merely be necessary to tie-in the movement of the pusher bars 57 and 58 electrically with these two operations and they with each other. This tie-in is a matter well within the skill of an electrician, using conventional electrical controls.

The stickholders 42 with their pendant confections 45 are deposited manually on the outwardly projecting ends of the rails 37 and 39 of the main trackway in front of the entrance of the first chilling and cooling tunnel 18 so that they are supported by their studs 43 at their four corners. This entrance portion of the main trackway is provided with a removably mounted bottom drip pan 141, which serves to catch any melted drippings from the newly defrosted confections 45. Of course, the stickholders 42 must be placed far enough inwardly on the main trackway for the pawls 61 of the pusher bars 57 and 58 to engage them by either their front or back pairs of studs 43. If we assume the pawls 43 engage the back pair of studs 43 in the first instance, the stick holder 42 will be moved forwardly a distance equal to the stroke of the piston 92, which is greater than the length of the stickholder 42 and sufficient to make certain that on the next forward movement of the pusher bars 57 and 58 the next forwardly depending pawl 61 will engage the front pair of studs 43. Thereafter, the stickholders 42 will be moved along the main trackway by said front pair of studs by each succeeding pawl.

When the pusher bars 57 and 58 are returning from their forward position, it will be observed that their pawls will slide over the studs 43 of the stickholders 42 on the main trackway and that they will remain at rest. On the next forward movement, the pawls 61 will again engage the forward pair of studs 43 and move the stickholders 42 forwardly along the main trackway a distance equal to the length of the stroke of the piston rod 91. This intermittent operation and movement will be repeated until the stickholder 42 emerges from the passageway 26 at the left end of the tunnel 18 in Figure 1, whereupon it will then be moved forwardly along the trackway over the coating operation 65. The position which the stickholder 42 will attain after its first movement over the coating operation 65 on the main trackway will be in vertical alignment with the inner dipping tank 68. During the next rest period of the intermittent movement of the stickholders 42, the dipping tank 68 will be moved vertically upwardly by its reciprocating arm 69 until the dependent confections 45 are submerged in the coating material contained in said tank. When the dipping tank 68 is returned to its lowermost position by the arm 69, it will be submerged in the main body of coating material in the main dipping tank 66. The next movement of the pusher bars 57 and 58 forwardly will move the newly coated confections 81 over and above that portion of the main dipping tank 66 which is covered with a wire tray 82. The stickholder 42 and its dripping coated confections 81 will remain in draining position over this tray section 82 during the next rest period, which is that period that the pusher bars 57 and 58 are on their return stroke. With the next succeeding forward movement of the pusher bars 57 and 58, the stickholder 42 and its coated confections 81 standing over the wire tray 82 will be moved forwardly and upwardly of the inclined portion of the rails 37 and 39 of the main trackway (see Fig. 2) until the pusher bars 83 with their depending pawls 84 of the second chilling and cooling tunnel 85, are able to engage the studs 43 of the stickholder 42 and take over the further movement of such stickholders through said second chilling and cooling tunnel.

The driving mechanism for the synchronized operations of the two sets of pusher bars for the two chilling and cooling tunnels 18 and 85, together with the reciprocating drive for the dipping arm 69, are not shown in detail because their detailed construction is of no particular importance to this invention. It is a simple matter for any skilled conveyor mechanic to operate all three of these arrangements in unison. With automatic defrosting operations and automatic bagging operations, it will be obvious that the movement of the stickholders through the chilling and cooling tunnels must be synchronized with such operations, and that all of the operations ahead of the bagging unit must be controlled by the operational movements of such unit to avoid jamming. The present tunnels 18 and 85 may be operated in unison by connecting their electrical controls in series so that the movement of the stickholders in the first tunnel 18 cannot be effected unless there is a corresponding movement of the stickholders in the second tunnel.

It will also be obvious and require little explanation to understand the operations of the air scoops 128 and 129 and 133 and 134. These spaced pairs of supporting brackets or arms 124 and 125 are mounted fixedly on the pusher bars 57 and 58 and reciprocate with said bars. With each reciprocating movement, the arms 124 and 125 are carried forwardly and backwardly therewith, thereby causing their transversely mounted scoops 128 and 129 and 133 and 134 to sweep or agitate the refrigerated air surrounding the refrigerated plates in the passageway 26. The scoops 128 and 129 and 133 and 134 are mounted on their respective arms in opposite directions, and, being of an arcuate shape, direct the movement of air upwardly around the pendant confections 45. The arms 124 and 125 extend in opposite directions and their respective scoops face oppositely of one another, whereby there is refrigerated air being directed against the confections 45 regardless of the direction of movement of the pusher bars 57 and 58. The substantially solid bottoms of the stickholders 42 serve to seal-off the top of the passageway 26, thereby preventing the refrigerated air from movement above the confections 45 depending from the main trackway.

Referring to Figure 3, there is shown in greater detail the construction of the cutting device 142 mounted below the supporting rails 37 and 39 for cutting any web-like formations (not shown) that might have been formed between longitudinal rows of adjacent confections 45. This device 142 has a closed bottom 143 and closed sides 144 and 146, forming a channel of a size and shape adapted to enclose the pendant confections 45 of a conventional stickholder 42. A series of transversely spaced and longitudinally extending vertical knives 147 are mounted on the inside of its bottom 143, which knives 147 have sharpened edges 148 that project upwardly above the tops of the confections 45 held in the stickholder 42. The web-like formations, when they form, are in a plane which is substantially in horizontal alignment with the tops of said confections 45. Obviously, since the sharpened edges of said knives 147 extend through said plane, these formations are cut by the edges of said knives and fall away from said confections 45 onto the bottom 143 of said cutting device. The strain placed on said formations by the cutting action of said knives 147 generally causes them to break away at their junction with said confection bodies, thereby leaving a smooth body surface for said confections.

Although we have only shown and described in detail but one form which our invention may assume, it will be apparent to those skilled in the art that the same is not to be so limited, but that various other modifications may be made therein without departing from the spirit thereof or from the scope of the appended claims.

What we claim is:

1. In a chilling and cooling tunnel, a stationary trackway extending longitudinally of a passageway adapted to receive and support a series of stickholders having pendant confections, a series of spaced refrigerating units surrounding said passageway below said trackway, reciprocating means for engaging said stickholders on said trackway, said means adapted to move said stickholders along said trackway only in one direction, and means for actuating said reciprocating means.

2. In a chilling and cooling tunnel, a stationary trackway extending longitudinally of an insulated passageway adapted to receive and support a series of stickholders having pendant confections, a series of spaced refrigerating units surrounding said passageway below said trackway, reciprocating means for engaging said stickholders on said trackway, said means adapted to move said stickholders along said trackway in only one direction, means actuated by said reciprocating means for agitating the air in said passageway, and means for actuating said reciprocating means.

3. In a chilling and cooling tunnel, a stationary trackway extending longitudinally of an insulated passageway adapted to receive and support a series of stickholders having pendant confections, a series of spaced refrigerating units surrounding said passageway below said trackway, reciprocating means for engaging said stickholders on said trackway, said means adapted to move said stickholders along said trackway in one direction and to pass over said stickholders when moved in the opposite direction, a series of spaced vanes actuated by said reciprocating means for agitating the air in said passageway, and means for actuating said reciprocating means.

4. In a chilling and cooling tunnel, a stationary trackway extending longitudinally of an insulated passageway adapted to receive and support end to end a series of stickholders having pendant confections, a series of spaced refrigerating units surrounding said passageway below said trackway, reciprocating means extending longitudinally above said trackway, said means having a series of longitudinally spaced depending pivotal pawls adapted to engage said stickholders on said trackway and move them only in one direction, a series of vanes carried by said reciprocating means for agitating the air in said passageway, and means for actuating said reciprocating means.

5. In a chilling and cooling tunnel, a stationary trackway having transversely spaced rails extending longitudinally of an insulated passageway adapted to receive and support a series of stickholders therebetween having pendant confections, a series of spaced refrigerating units surrounding said passageway below said trackway, a second stationary trackway mounted above said first trackway, said second trackway having a bar mounted slidably thereon, said bar having a series of longitudinally spaced depending pawls adapted to engage stickholders supported by said first trackway, said pawls being pivotal in one direction, means including vanes carried by said bar for agitating the air in said passageway, and means for reciprocating said bar over said second trackway.

6. In a chilling and cooling tunnel, a stationary trackway having transversely spaced rails extending longitudinally of an insulated passageway adapted to receive and support a series of stickholders having pendant confections, a series of spaced refrigerating plates surrounding said passageway below said trackway, a second stationary trackway having transversely spaced rails mounted above said first trackway, each rail of said second trackway having a bar mounted slidably thereon, each of said bars having a series of longitudinally spaced depending pawls adapted to engage a stickholder carried by said first trackway, said pawls being pivotal only in one direction to move said stickholders only in a forwardly direction, means carried by said bars for agitating the air in said passageway below said trackways, and means for reciprocating said bars over their respective rails.

7. In a chilling and cooling tunnel, a stationary trackway having transversely spaced rail members extending longitudinally of a passageway adapted to receive and support a series of stickholders therebetween having pendant confections, a second stationary trackway mounted above said first trackway having transversely spaced rail members, each rail member of said second trackway consisting of a series of longitudinally spaced bracket supports, a bar mounted reciprocably on each rail member of said second trackway, each bar having a series of longitudinally spaced depending pawls adapted to engage stickholders supported by said first trackway, said pawls being pivotal in one direction, means for reciprocating said bars over said second trackway.

8. In a chilling and cooling tunnel, a stationary trackway having transversely spaced rails extending longitudinally of a passageway adapted to receive and support a series of stickholders therebetween having pendant confections, a second stationary trackway mounted above said first trackway having a pair of transversely spaced supporting rails, each rail member of said second trackway consisting of a series of longitudinally spaced bearing supports, a bar reciprocably mounted over each rail member of said second trackway, said bars of each rail member being connected fixedly at longitudinally spaced intervals, each bar having a series of longitudinally spaced depending pawls adapted to engage stickholders supported by said first trackway, said pawls being pivotal in one direction, and means for reciprocating said bars over said rails of said second trackway.

9. In a chilling and cooling tunnel, a stationary trackway having transversely spaced rails extending longitudinally of an insulated passageway adapted to receive and support end to end a series of stickholders having pendant confections, a series of spaced refrigerated units surrounding said passageway below said trackway, a second stationary trackway having a pair of transversely spaced rails mounted above said first trackway, said rails of said second trackway being slotted bearing supports spaced longitudinally of said passageway, a pair of transversely spaced and fixedly connected bars mounted slidably one within each of said series of longitudinally spaced bearing supports forming the rails of said second trackway, each bar having a series of longitudinally spaced pawls depending therefrom and adaped to engage the stickholders on said first trackway for moving them only in one direction, a series of spaced air scoops carried by said bars for agitating the air in said passageway and directing it towards the confections depending from said stickholders, and means for actuating said bars reciprocably over the rails of said second trackway.

10. In a chilling and cooling tunnel, stationary trackway having transversely spaced rails extending through an insulated passageway adapted to receive and support a series of stickholders having pendant confections, a series of refrigerating units surrounding said passageway below said trackway, a second stationary trackway having a pair of transversely spaced rail members mounted above said first trackway, each rail member of said second trackway consisting of a series of longitudinally spaced bracket supports, each bracket support having an open slot along its inward side, a bar mounted slidably in each series of bracket supports forming a rail member of said second trackway, said bars being connected together transversely at longitudinally spaced intervals to operate in unison, each bar having a series of longitudinally and oppositely spaced depending pawls pivotal only in one direction and adapted to engage the stickholders on the first trackway, means for reciprocating said bars over their respective rails to move the stickholders forwardly of said passageway.

11. In a chilling and cooling tunnel, a stationary trackway extending longitudinally thereof adapted to receive and support a series of stickholders having pendant confections, reciprocating means for engaging said stickholders on said trackway, said means adapted to move said stickholders along said trackway in one direction only, means mounted on said trackway for cutting any web-like formations between the confections of longitudinally adjacent rows as they are moved therealong with their stickholders, and means for actuating said reciprocating means.

12. In a chilling and cooling tunnel, a stationary trackway having transversely spaced rails extending longitudinally of a passageway adapted to receive and support end to end a series of stickholders having pendant confections, means mounted between said rails including a plurality of transversely spaced and longitudinally extending knives for cutting any web-like formations between adjacent longitudinal rows of confections as their stickholders are moved along said trackway, a series of spaced refrigerated units surrounding said passageway below said trackway, reciprocating means extending longitudinally above said trackway, said means having a series of longitudinally spaced depending pawls adapted to engage said stickholders on said trackway and move them only in one direction, means actuated by said reciprocating means for agitating the air in said passageway and directing it towards said confections, and means for actuating said reciprocating means.

13. In a chilling and cooling tunnel, a stationary trackway extending through an insulated passageway adapted to receive and support a series of stickholders having pendant confections, said passageway having end closure plates that are readily removable for cleaning purposes, a series of refrigerating units surrounding said passageway below said trackway, reciprocating means consisting of a series of longitudinally and pivotally connected bars mounted above said trackway, said bars having a series of longitudinally spaced pendant pawls pivotally mounted thereon for engaging the stickholders on said trackway, said pawls adapted to move said stickholders along said trackway in a forwardly direction and to pass over said stickholders when moved in the opposite direction, means vertically spaced within said passageway for agitating the air below said trackway, and means for actuating said reciprocating means in said passageway.

14. In a chilling and cooling tunnel, a stationary trackway having transversely spaced rails extending through an insulated passageway adjacent its top and adapted to receive and support a series of stickholders having pendant confections, the bottom of said stickholders being of a size and shape to form substantially a secondary closure for the top of said passageway, a series of refrigerating units surrounding said passageway below said trackway, a second stationary trackway having a pair of transversely spaced rails mounted above said first trackway, said second trackway having a bar mounted slidably thereon, said bar having a series of longitudinally spaced depending pawls adapted to engage stickholders supported by said first trackway, said pawls being pivotal only in a backwardly direction, means including vanes carried by said bar for agitating the air in said passageway, and means for reciprocating said bar over said second trackway.

15. In a chilling and cooling tunnel, a stationary trackway having transversely spaced rails extending longitudinally of an insulated passageway adapted to receive and support a series of stickholders therebetween having pendant confections, a series of spaced refrigerating units mounted adjacent the bottom of said passageway, said units being spaced longitudinally and mounted so that air passing therebetween will be deflected upwardly against said pendant confections, a second stationary trackway mounted above said first trackway, said second trackway having a bar mounted slidably thereon, said bar having a series of longitudinally spaced depending pawls adapted to engage stickholders supported by said first trackway, means including a series of vanes carried by said bar for agitating the air below said refrigerating units whereby the same is caused to be moved upwardly between adjacent units towards said confections, and means for reciprocating said bar over said second trackway.

References Cited in the file of this patent

UNITED STATES PATENTS

| 1,167,216 | Rathsfeld | Jan. 4, 1916 |
| 2,225,532 | Decker | Dec. 17, 1940 |
| 2,681,132 | Knutson | June 15, 1954 |

FOREIGN PATENTS

| 25,261 | Sweden | Aug. 15, 1908 |